Patented July 29, 1924.

1,503,044

UNITED STATES PATENT OFFICE.

JOSEF HALLER, OF WIESDORF, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE, GERMANY.

NEW AZODYESTUFFS.

No Drawing. Application filed September 26, 1922. Serial No. 590,721.

*To all whom it may concern:*

Be it known that I, JOSEF HALLER, a citizen of Germany, residing at Wiesdorf, near Cologne-on-the-Rhine, Germany, have invented new and useful Improvements in New Azodyestuffs, of which the following is a specification.

In the United States Letters Patent 1,206,232 a process for the production of new azodyestuffs is described which consists in combining diazocompounds obtained from asymmetrically alkylized para-diamino-azo bodies with arylids of 2.3-oxynaphthoic acid. In this manner fast black dyestuffs are obtained, which may be produced as well in substance as on the fibre.

I have now found that new violet to black dyes of a greater fastness to light are obtained by using in this process such asymmetrically alkylized diamino-azo bodies as contain in the aromatic nucleus a negative group e. g. $NO_2$, Cl, Br etc.

The new dyes have most probably the following general formula:

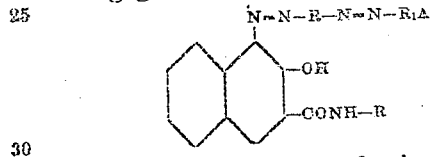

wherein A means an alkylamino group in ortho position to the azo group, while R means an aromatic residue and $R_1$ an aromatic residue containing a negative group. These dyestuffs when treated with hydrochloric acid and stannous chlorid are decomposed into an alkylized diamin containing a negative group, which may be changed by the reduction, a diamin and an arylid of 1-amino-2-oxynaphthoic acid.

The above mentioned diamino-azo bodies which are not yet described in print can be obtained by diazotizing ortho-aminodialkylanilins containing negative groups such as: 4-chloro-2-amino-1-dimethylaminobenzene, 4-nitro-2-amino-1-dimethylaminobenzene, 4-nitro-2-amino-N-methyldiphenylamin etc. and combining the resulting diazocompounds with aromatic amins, which can be diazotized after the combination, such as: para-xylidin, 3-amino-4-methoxy-1-methylbenzene (cresidin), meta-aminoacetanilid etc.

In order to illustrate the new process more fully the following examples are given, the parts being by weight:— 27 parts of 4-nitro-2-amino-1-dimethylaminobenzene are dissolved in 400 parts of water and 40 parts of concentrated hydrochloric acid. The mixture is cooled and a solution of 10 parts of sodium nitrite in water is added. To the diazosolution thus obtained a solution of 22 parts of 3-amino-4-methoxy-1-methylbenzene is added. The mineral acid is neutralized with sodium acetate and the solution stirred until all diazocompound has entered into reaction. Subsequently the mixture is rendered acid with hydrochloric acid, the precipitate is filtered off and washed with water containing a small amount of an acid.

329 parts of this azocompound are diazotized in the usual manner and poured into a well cooled solution of the disodium salt from 270 parts of anilid of 2.3-oxynaphthoic acid to which sodium carbonate has been added in excess.

The dyestuff separates in black flakes, it is practically insoluble in water. When heated with hydrochloric acid and stannous chlorid the dye is decomposed into aminodimethylphenylenediamin, methoxy-methylphenylenediamin and the anilid of 1-amino-2-oxynaphthoic acid. The new dye has most probably the following formula:

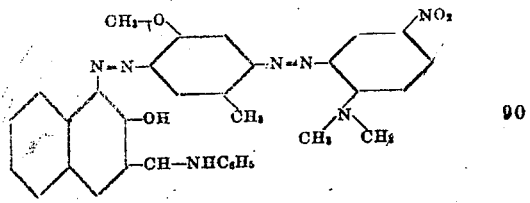

The following examples may show the production of the dyestuffs on the fibre: 6 grams of the anilid of 2.3-oxynaphthoic acid are mixed together with 10 cubic centimeters of caustic soda lye 30° Bé. and 24 cubic centimeters of turkey red oil, one liter of hot water is added and the mixture is heated until a solution is obtained. The cotton is entered into this solution and left therein for 12 minutes.

For preparing the diazo solution 8 grams of the azocompound obtained from diazotized 4-nitro-2-amino-1-dimethylanilin by combination with cresidin are mixed with 10 cubic centimeters of hydrochloric acid (30 per cent) and after addition of ice is diazotized with 15 cubic centimeters of a ten per cent solution of sodium nitrite. Subsequently the mineral acid of this solution is neutralized with sodium acetate and the whole is brought to one liter.

The cotton impregnated at above mentioned is then entered into the cold diazo-solution, left therein for 15 minutes, soaped for 10 minutes in a boiling bath containing 2 grams of soap in one liter, washed and dried. A dark black shade fast to boiling, chlorine and light is thus obtained.

For printing purposes the above diazo compound is passed with tragacanth or another thickening agent and before use neutralized with a sodium acetate solution (1:1).

I claim:

1. As new articles of manufacture the dyestuffs having most probably the formula:

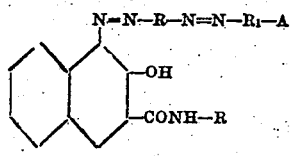

wherein A means an alkylamino group, $R_1$ an aromatic residue containing a negative group, R an aromatic residue, which dyestuffs, when reduced give an alkylized diamin containing a negative group which may be changed by reduction, a diamin and an arylid of 1-amino-2-oxynaphthoic acid, substantially as described.

2. Textile material dyed with the new azodyestuffs defined in claim 1.

In testimony whereof I have hereunto set my hand.

JOSEF HALLER.